Oct. 6, 1964 H. STRACHE 3,151,673
DEVICE FOR HEATING OR COOLING A MEDIUM, PARTICULARLY
AIR, BY MEANS OF HIGH PRESSURE
Filed Aug. 29, 1961 2 Sheets-Sheet 2
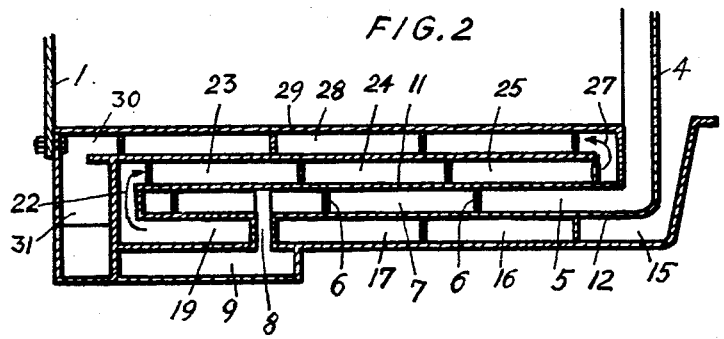
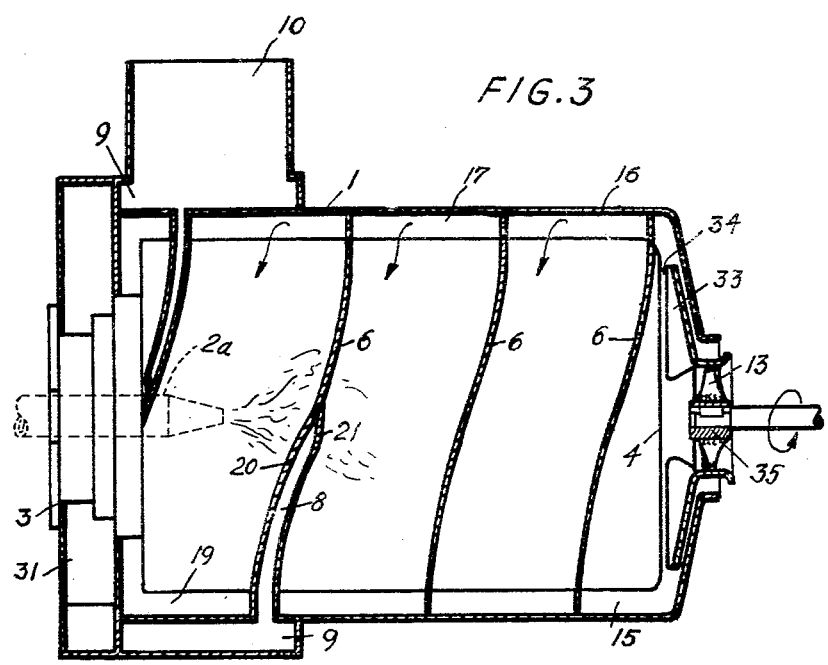
INVENTOR
HORST STRACHE
By
Lowry & Rinehart
ATTYS.

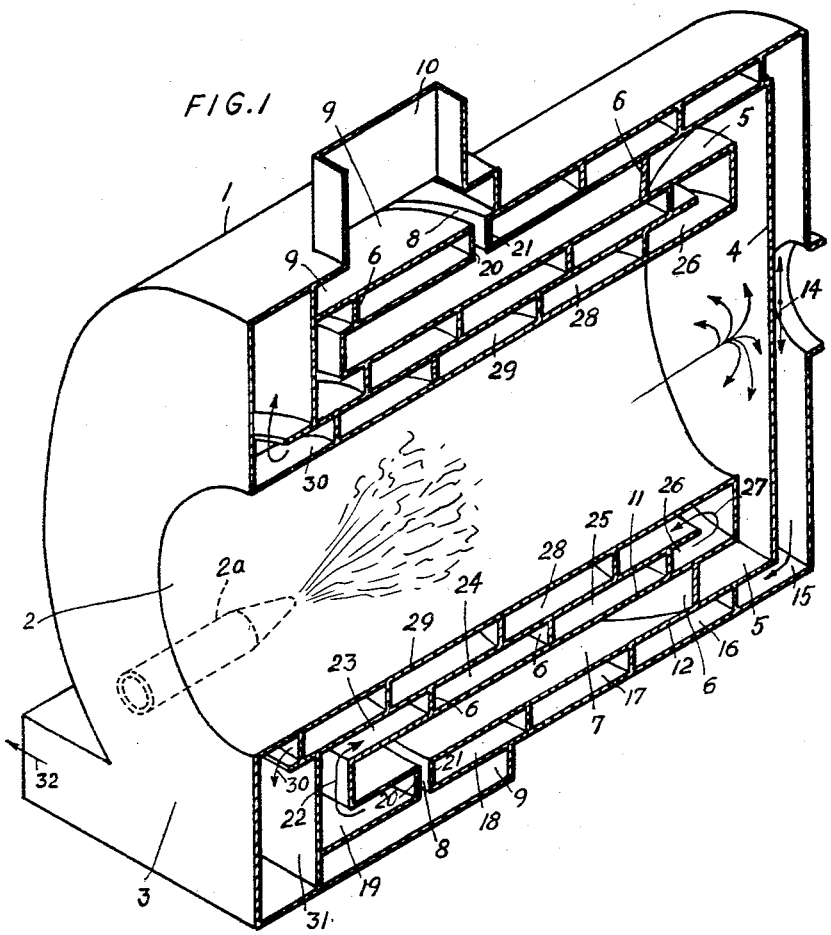

United States Patent Office 3,151,673
Patented Oct. 6, 1964

3,151,673
DEVICE FOR HEATING OR COOLING A MEDIUM, PARTICULARLY AIR, BY MEANS OF HIGH PRESSURE
Horst Strache, Hamburg, Germany, assignor to Friedrich-Wilhelm Jeroch, Hamburg-Bahrenfeld, Germany
Filed Aug. 29, 1961, Ser. No. 134,709
Claims priority, application Germany Aug. 30, 1960
3 Claims. (Cl. 165—155)

This invention relates to a device for heating or cooling a medium, particularly air, by means of high pressure, in which the medium to be heated or cooled is sucked and pressed into a heated or cooled heat exchanger by means of a blower, pump or the like and delivered therefrom to the places where it is required.

Such devices which are used for air conditioning in rooms and for heating rooms are known in the art. They all have, however, the disadvantage that large cross-sections are required for the passages of the medium. This involves great losses of heat and cold, respectively. When the known devices are used for heating air, they cannot be supplied with a maximum amount of air from the atmosphere without having to put up with great losses of heat necessary for primarily heating up the air. The known devices are, moreover, very expensive and require much space because of their size and the requisite mechanical equipment, e.g. insulations.

It is the object of the present invention to overcome the aforementioned disadvantages.

This object is attained by the provision of a device for heating or cooling a medium, particularly air, by means of high pressure, which comprises a heat exchanger, means on said heat exchanger for sucking and feeding under high pressure a medium to be heated or cooled into the heat exchanger, a plurality of spaced coaxially arranged cylinders within said heat exchanger, said cylinders constituting heat-exchanging surfaces, a heating-cooling chamber within said heat exchanger and surrounded by said cylinders, helical partitions connecting adjacent cylinders and defining helical annular channels part of which is arranged to guide a heat-exchanging medium and part of which is arranged to guide the medium to be heated or cooled by said heat-exchanging medium, the channels for the latter medium being disposed between the channels for the medium to be heated or cooled to define outer and inner helical annular channels for the medium to be heated or cooled and communicating with said heating-cooling chamber, an outer helical annular space within said heat exchanger for passing the feed medium to be heated or cooled successively into said outer channels and thence into said inner channels, and overflow passages extending through said outer channels for the medium to be heated and cooled and arranged to conduct the heat-exchanging medium from its channels via an annular chamber into the open.

The flow of the medium to be heated or cooled within the heat exchanger takes place with the slightest resistance due to the turbulence caused by the means for sucking and feeding said medium and a forced flow is avoided. The exchange of heat or cold is very intensive and the cross-sections of the channels are small. Owing to its helical motion, the medium to be heated or cooled can flow about sharp edges without any appreciable losses of speed. The heat-exchanging medium and the medium to be heated or cooled are caused to flow through their respective channels in opposite directions during the exchange of heat or cold and cross each other without any resistance.

The feed means for the medium to be heated or cooled, may comprise a blower, a pump or the like and have an impeller which is mounted for rotation in the outer helical annular space. Thereby the tangential flow of the medium to be heated or cooled is converted into a helical flow without any forced deflection of said medium taking place.

A source of heat or a cooling apparatus may be arranged at or in one end face of the heat exchanger, whereas the feed means for the medium to be heated or cooled, embodied in the blower, pump or the like may be arranged at or in the other end face of the heat exchanger. When heating air, the air current intensively acts on an end face of the heating-cooling chamber and has a strong cooling effect on this face which is particularly exposed to the action of the heating medium. The efficiency of the blower and the cooling effect can be determined by appropriately selecting the distance of the impeller of the blower from the end face of the heating-cooling chamber. This selection may be effected manually or automatically.

The helical annular channels together with their helical overflow passages may be connected in such a manner that the heating or cooling medium is caused to pass through its channels in a direction opposite to the direction of flow of the medium to be heated or cooled.

The overflow passages may be formed by a double-walled helical partition section.

When air is to be heated by the source of heat, the combustion air necessary for the source of heat may be tapped from the air fed by the feed means.

A preferred embodiment of the invention will now be described by way of example and with reference to the accompanying drawings, in which:

FIG. 1 is a perspective view of a cylindrical heat exchanger according to the invention, shown in longitudinal section;

FIG. 2 is a longitudinal section through the lower part of the heat exchanger, and FIG. 3 is a side elevational view of the heat exchanger with part of the outer cylindrical wall being removed.

Referring now to the drawings, FIG. 1 shows a device for heating or cooling a medium, particularly air, by means of high pressure, which comprises a cylindrical heat exchanger 1 having in its interior a plurality of radially spaced cylinders constituting heat-exchanging surfaces and forming annular channels between them. All cylinders are coaxially arranged and define a heating-cooling chamber 2 in the heat exchanger 1. At or in one end face 3 of the heating-cooling chamber 2 a source of heat 2a, e.g. an oil burner (as shown), or a cooling apparatus may be connected to the heat exchanger 1 or inserted in the heating-cooling chamber 2 from this end face. In operation the heating or the cooling medium passes through the heating-cooling chamber 2 and strikes against the opposite end face 4 of the heating-cooling chamber 2 where it is deflected at right angles radially outwardly so as to flow into a narrow annular chamber 5 as indicated by the arrows in FIG. 1. From this annular chamber 5 the heating or cooling medium flows along a helical partition 6 imparting it a helical motion into a helical annular channel 7 and thence through helical overflow passages 8 into an annular chamber 9 where it leaves the heat exchanger 1 through an outlet 10. The helical overflow passages 8 extend through the outer helical annular channels for the medium to be heated or cooled and form part of a partition section comprising two walls 20 and 21 which join after a full turn of said partition section, as can be seen from FIG. 3. When passing through the helical annular channel 7 the heating or cooling medium contacts heat-exchanging surfaces 11 and 12 of the annular channel 7 which transfer the heat or cold to the medium actually passing through the adjacent annular channels.

Means for feeding the medium to be heated or cooled into the heat exchanger 1 are arranged adjacent the outer side of the end face 4 of the heating-cooling chamber 2. In the embodiment illustrated in FIG. 3 these feed means comprise a blower 13 constructed as a centrifugal accelerator. The blower 13 has an impeller 33 and is axially adjustably mounted in a bearing 35 to permit a gap 34 between the end face 4 and the impeller 33 to be varied in width. The bearing 35 of the blower 13 may also be so connected with the end face 4 that the blower 13 together with its impeller 33 is movable in dependence on the expansion of the end face 4 caused by the heating medium striking against said end face from the opposite side. It is noted that instead of the blower 13 also a pump or the like may be provided.

When the blower 13 is in operation and for example air is sucked from the atmosphere into the heat exchanger 1 and directed against the end face 4 of the heating-cooling chamber 2 where it is deflected at right angles radially outwardly in the directions of arrows 14 so as to flow into an outer helical annular space 15. Within this outer helical annular space 15 the medium to be heated or cooled moves helically about the heat-exchanging surface 12 in a direction opposite to the direction of flow of the heating or cooling medium while retaining the helical motion caused by the blower 13 and then passes successively through helical annular channels 16, 17, 18 and 19, thereby crossing the direction of flow of the heating or cooling medium passing through the annular channel 7. The medium to be heated or cooled retains its helical motion by the action of the helical partitions 6.

From the helical annular channel 19 the medium to be heated or cooled flows in the direction of arrow 22 (see also FIG. 2) into an inner helical annular channel 23 without the direction of flow of the medium being reversed but the medium continuing to flow in the same direction while turning about its axis. The medium then passes through a further series of inner helical annular channels 24, 25 and 26, contacting the heat exchanging surface 11 and thence in the direction of arrow 27 through an inner helical annular channel 28 while contacting a helical wall 29 of the heating-cooling chamber to flow in the direction of arrow 30 into a collecting channel 31 from where it is guided in the direction of arrow 32 to the place where it is required. It is thus clear that when contacting the heat-exchanging surfaces 11 and 12 and the cylindrical wall 29, the medium is heated or cooled by the heat-exchanging medium actually passing through the heating-cooling chamber 2, the narrow annular chamber 5 and the helical annular channel 7.

It is understood that the heat exchanger can be enlarged according to requirements and the number of the annular channels increased.

The turbulent motion of the medium to be heated or cooled caused by the blower 13 at the end face 4 of the heating-cooling chamber 2 where the difference in temperature is especially high is of particular advantage.

I claim:

1. Apparatus for treating a fluid medium to change the temperature thereof comprising a heat exchanger formed with an outer shell, a central heat exchange chamber, a plurality of spaced coaxial cylinders surrounding said chamber interiorly of said shell, the walls of said cylinders comprising heat exchanging surfaces, helical partitions defining spiral channels in each cylinder, an outer annular chamber at one end of said shell communicating with the outermost of said cylinders, means for introducing said fluid medium to be treated into said annular chamber and hence said outermost cylinder under high pressure, an inner annular chamber at said one end of said heat exchange chamber having an outer wall which comprises an inner wall of said outer annular chamber, said inner annular chamber communicating with the next inner cylinder and defining a spiral passage for a fluid heat exchange medium in the same direction of flow as the flow in said outermost cylinder, means communicating the outermost cylinder with a third cylinder interiorly of said next inner cylinder to direct said fluid medium to be treated in a direction opposite to that of said heat exchange medium, and means communicating said third cylinder with an innermost cylinder having an inner wall common with the outer wall of said heat exchange chamber and directing the flow of said fluid medium to be treated again in the same direction as said fluid heat exchange medium, an annular outlet chamber at the other end of said shell communicating with said innermost cylinder, and an outlet tube for the treated fluid medium from said annular outlet chamber.

2. The structure of claim 1 wherein overflow passages extend through said outer channels for the medium to be treated and are arranged to conduct the heat exchanging medium from its channels via an annular chamber into the open.

3. A device as claimed in claim 2, wherein the overflow passages are formed by a double-walled helical partition section.

References Cited in the file of this patent

UNITED STATES PATENTS

| | | |
|---|---|---|
| 1,456,255 | Shaw | May 22, 1923 |
| 2,263,098 | Mueller | Nov. 18, 1941 |
| 2,543,201 | Ripley | Feb. 27, 1951 |
| 2,870,997 | Suderstrom | Jan. 27, 1959 |
| 2,938,712 | Pellmyr | May 31, 1960 |